United States Patent
Gannon et al.

(10) Patent No.: US 9,892,436 B1
(45) Date of Patent: Feb. 13, 2018

(54) FACILITATING THE PURCHASE OF ITEMS ASSOCIATED WITH AN APPLICATION

(75) Inventors: Benjamin David Gannon, Kirkland, WA (US); Siddharth S. Easwar, Seattle, WA (US); David Allen Markley, Bellevue, WA (US); Christian L. Adam, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 440 days.

(21) Appl. No.: 13/433,838

(22) Filed: Mar. 29, 2012

(51) Int. Cl.
*G06Q 30/06* (2012.01)
*G06F 21/10* (2013.01)

(52) U.S. Cl.
CPC ......... *G06Q 30/0601* (2013.01); *G06F 21/10* (2013.01)

(58) Field of Classification Search
USPC .................................................. 705/26.1, 51
See application file for complete search history.

(56) References Cited

U.S. PATENT DOCUMENTS

| | | | |
|---|---|---|---|
| 8,070,599 B2* | 12/2011 | Van Luchene | 463/29 |
| 2008/0096668 A1* | 4/2008 | Yoshioka | 463/42 |
| 2009/0327094 A1* | 12/2009 | Elien et al. | 705/26 |
| 2011/0225498 A1* | 9/2011 | Goldman et al. | 715/727 |

* cited by examiner

*Primary Examiner* — Tsan-Yu J Huang
(74) *Attorney, Agent, or Firm* — Thomas | Horstemeyer, LLP

(57) ABSTRACT

The present disclosure involves selling virtual items for an application via electronic commerce systems. A catalog of virtual items is stored in a data store, where each of the virtual items relates to an interaction with an application. An electronic commerce system is provided that facilitates a purchase of one of the virtual items via a client device over a network, where the one of the virtual items is purchased in association with an application account associated with the application. The electronic commerce system also informs the application of the purchase of one of the virtual items to facilitate use of the purchased virtual item during interaction by a user with the application.

15 Claims, 8 Drawing Sheets

FACILITATING THE PURCHASE OF ITEMS ASSOCIATED WITH AN APPLICATION

BACKGROUND

It is commonplace for users to consume and interact with applications. In some cases, a user may purchase various items associated with an application.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Various embodiments of the present disclosure relate to facilitating the purchase of items to be used during interaction with an application. Such an application may comprise, for example, an online gaming application, a work productivity application (e.g. a word processor or spreadsheet) that is accessed over a network such as the Internet or other networks. In one embodiment, an electronic commerce system may generate listings for items such as virtual items that may be purchased for use in association with interaction with the application by a user. In one embodiment, a user that purchases items through such an electronic commerce system has a user account associated with such system. Also, the same user may have an application account associated with the application. According to various embodiments, to facilitate the purchase of virtual items through the electronic commerce system for use with the application, one or more application accounts of the user or others may be linked with their user account. The user may thus purchase virtual items through the electronic commerce system for use with a respective application. In doing so, the user may specify the application account with which the virtual item purchased is to be associated. Assuming that such application account is eligible for the purchase, the electronic commerce system communicates with the application to inform the application of the purchase of the virtual item for the respective application account. In addition, other aspects of the present disclosure are described. In the following discussion, a general description of the system and its components is provided, followed by a discussion of the operation of the same.

Figure 1:
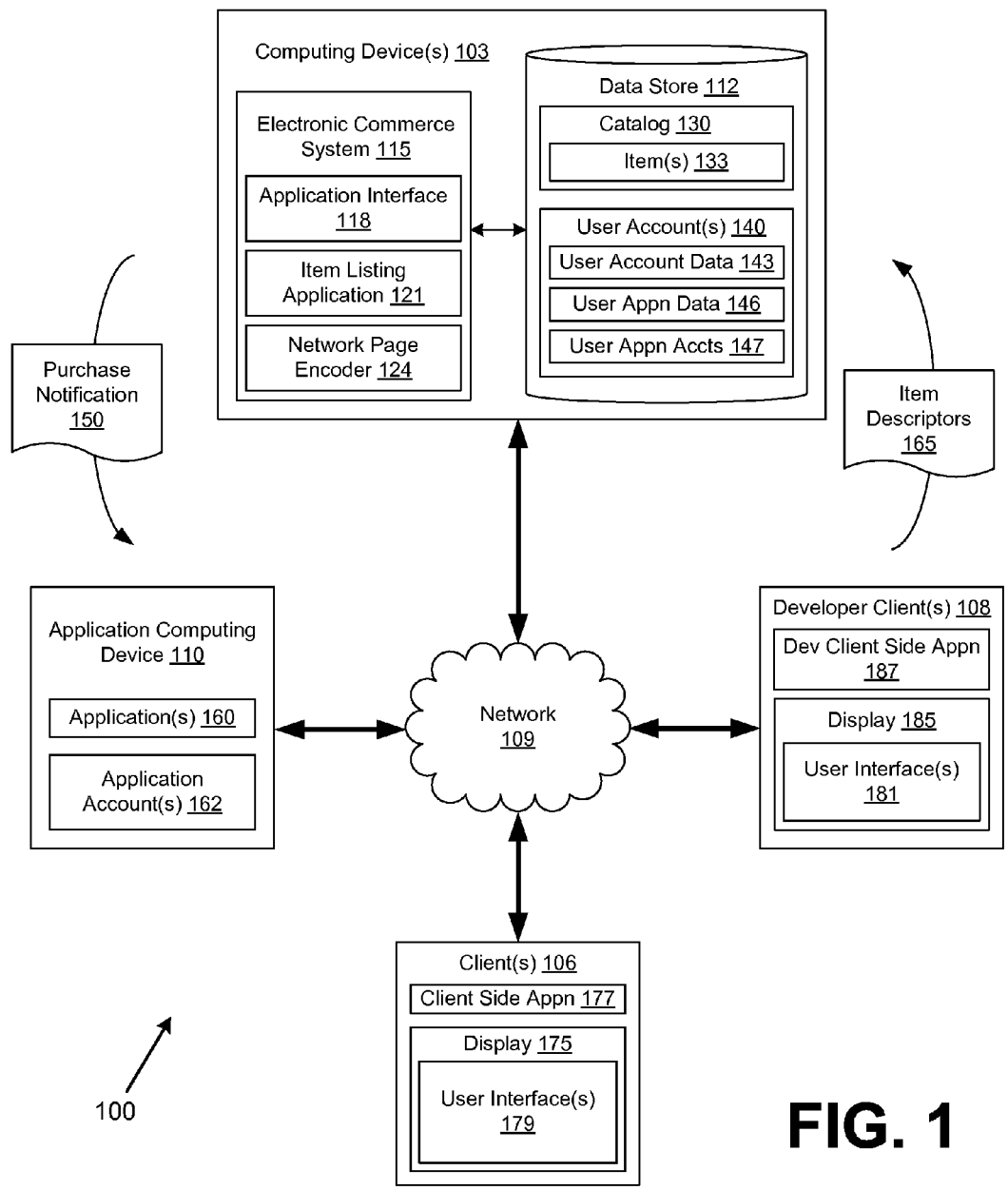
FIG. 1 is a drawing of a networked environment according to various embodiments of the present disclosure.

With reference to FIG. 1, shown is a networked environment 100 according to various embodiments. The networked environment 100 includes a computing device 103 in data communication with one or more user clients 106, one or more developer clients 108, and/or application computing devices 110 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The data in the data store 112 is accessed and/or stored by various executable components in the computing device 103 as will be described. For example, stored in the data store 112 are a catalog 130 of items 133, user accounts 140, and other information as can be appreciated. The items 133 may comprise, for instance, physical items, digital items (i.e. digital media), or other types of items. In one embodiment, the digital items may comprise virtual goods, such as, for example, digital enhancements for online participation in online games (e.g. tools, weapons or enhancements to avatars), enhancements to a service subscription, enhancements to an application, or other virtual goods that may be used by a user while interacting with an application.

Associated with each user account 140 are user account data 143, user application data 146, user application accounts 147, and potentially other data. The user account data 143 may comprise information about a particular user of the electronic commerce system 115, such as, for example, name, address, payment instruments, billing information, account settings, passwords, wish lists, purchase recommendations, a browsing history, a purchase history, and potentially other data.

The user application data 146 may comprise information extracted from a user's account relating to the interaction with the application by the user. To this end, the user application data 146 may describe anything relating to the interaction between the user and the application, such as, for instance, a user's performance with respect to an attribute of the application, the state of an application when last ended, the inputs made by the user during the course of the application, the prizes awarded to the user due to their participation, and/or any other information. For example, in the case that the application comprises an online game, the user application data 146 may comprise a listing of avatars or characters of the user, an inventory of weapons used by the user, a record of game money held by the user, and potentially other information. In another example, where the application comprises a work productivity application such as a word processor, the user application data 146 may include a listing of features of the word processor purchased or used by the user in the past or other information.

The user application accounts 147 comprise accounts for an application that are associated with a given user account 140 as will further be described below.

The components executed on the computing device 103, for example, include an electronic commerce system 115 and other applications, services, processes, systems, engines, or functionality not discussed in detail herein. The electronic commerce system 115 may include various components such as, for instance, an application interface 118, an item listing application 121, a network page encoder 124, and other applications and/or processes as can be appreciated.

The electronic commerce system 115 is executed in order to facilitate the online purchase of items 133 over the network 109. The electronic commerce system 115 also performs various back-end functions associated with the online presence of a merchant in order to facilitate the online purchase of items 133. For example, the electronic commerce system 115 may generate network content such as network pages using the network page encoder 124 or other types of network content that are provided to clients 106 for the purposes of selecting items 133 for purchase, rental, download, lease, or any other forms of consumption as can be appreciated. In one embodiment, the network pages may comprise web pages that are rendered by a browser. Alternatively, the network content may comprise data that is rendered in the form of a user interface by a dedicated or special purpose client side application as will be described. As yet another alternative, a mobile application may be executed in a client 106 to generate and render user interfaces using data served up by the computing device 103 and/or other servers. Ultimately, the network content generated by the electronic commerce system 115 is presented to a user on a client 106 in the form of a user interface that is rendered on a display device as will be described.

The application interface 118 facilitates the communication of data between an application on the client 106 and the electronic commerce system 115. To this end, the application interface 118 may generate a purchase notification 150 that indicates items 133 have been purchased for a specified application account 162 associated with an application 160 as will be described. The application interface 118 may be configured to obtain item descriptors 165 from clients 106 by way of network 109. Additionally, the application interface 118 may be configured to obtain the user application data 146 about one or more users interacting with various applications as will be described. The item listing application 121 executed on the computing device 103 may be configured to generate listings for items 133 associated with one or more applications. In one embodiment, such listings may be based upon the item descriptors 165 obtained through the application interface 118 as will be described.

The user client 106 and the developer client 108 are each representative of a respective plurality of client devices that may be coupled to the network 109. The user client 106 and the developer client 108 may each comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, smartphones, electronic book readers, or other devices with like capability.

The user client 106 includes a display 175, and the developer client 108 includes a display 185. Each display 175, 185 may comprise, for example, one or more devices such as cathode ray tubes (CRTs), liquid crystal display (LCD) screens, gas plasma-based flat panel displays, LCD projectors, or other types of display devices, etc. A client side application 177 is executed on the client 106 to render network content from the electronic commerce system 115 in the form of user interfaces 179 on the display device 175. The client side application 177 may comprise, for example, a browser that renders network pages comprising web pages and the like. Alternatively, the client side application 177 may comprise a dedicated or special purpose application that generates a user interface from network content received from the electronic commerce system 115. Similarly, a developer client side application 187 is executed on the developer client 108 to render network content from the electronic commerce system 115 in the form of user interfaces 181 for a developer. The developer client side application 187 may comprise, for example, a browser that renders network pages comprising web pages and the like. Alternatively, the developer client side application 187 may comprise a dedicated or special purpose application that generates a user interface from network content received from the electronic commerce system 115. The user client 106 and/or the developer client 108 may be configured to execute applications beyond the client side application 177 or the developer client side application 187 such as, for example, email applications, instant message applications, and/or other applications.

The application computing device 110 may comprise, for example, a server computer or any other system providing computing capability. Alternatively, a plurality of application computing devices 110 may be employed that are arranged, for example, in one or more server banks, computer banks or other arrangements. For example, a plurality of application computing devices 110 together may comprise a cloud computing resource, a grid computing resource, and/or any other distributed computing arrangement. Such application computing devices 110 may be located in a single installation or may be distributed among many different geographical locations. For purposes of convenience, the application computing device 110 is referred to herein in the singular. Even though the application computing device 110 is referred to in the singular, it is understood that a plurality of application computing devices 110 may be employed in the various arrangements as described above.

In one embodiment, the application computing device 110 may be configured to serve up one or more applications 160 to the user client 106 through network 109. For example, the application computing device 110 may generate network pages or other network content from which the user interfaces 179 are rendered on the user client 106 to facilitate a user interaction with the application 160. Further, the application computing device 110 may be configured to automatically inject one or more purchased items 133 bought by the user into an application 160 with which the user interacts as will be described. According to one embodiment, the operation of the application 160 is separate from, or independent of, the operation of the electronic commerce system 115. For example, to say that the operation of the application 160 and the electronic commerce system 115 are independent means that they perform their respective functions independent of one another such that, in the end, each of these systems could operate without any interaction with the other. To the extent that the various embodiments discuss interaction between the electronic commerce system 115 and an application 160 for purposes of facilitating the purchase of items 133 used in an application 160 for other purposes as described herein, such interaction provides a mutual benefit to both entities operating these systems. However, the electronic commerce system 115 and a respective application 160 are still independent because they could otherwise operate without such interaction. That is to say, the electronic commerce system 115 can be employed to facilitate the purchase of items 133 unrelated to a respective application 160, and user interaction with an application 160 may not relate to the electronic commerce system 115 at all.

In one embodiment, an application 160 may be, for example, a game and/or other types of applications. As non-limiting examples, an application 160 may comprise a game, such as, for instance, a first-person shooter game, an action game, an adventure game, a party game, a role-playing game, a simulation game, a strategy game, a vehicle simulation game, and/or other types of games. Further, the application 160 may comprise a word processor, office management application, enterprise resource planning applications, and/or any other type of application.

In order to use an application 160, a user may be required to establish an application account 162 for the application 160. The operator of the application 160 may store the application accounts 162 in association with the application 160 to facilitate authentication, billing for use, and other purposes. One or more of the application accounts 160 may be stored in association with a respective user account 140 associated with the electronic commerce system 115. Specifically, a user may associate his/her application account 162 or the application accounts 162 of others with his/her user account 140. Such application accounts 160 are stored as the user application accounts 147 in the data store 112.

Next, a general description of the operation of the various components of the networked environment 100 is provided. To begin, a developer wishing to sell items 133 associated with an application 160 may provide one or more item descriptors 165 for such items 133 to the electronic commerce system 115. To this end, the electronic commerce system 115 may be configured to execute the application interface 118 to present network pages or other network content to the developer client 108 to generate various user interfaces 181 in order to facilitate an upload of one or more item descriptors 165 from the developer client 108 through network 109. According to one embodiment, each item 133 comprises one or more virtual items, functions, services, subscriptions, or other items associated with an application 160.

In one embodiment, an item descriptor 165 may comprise a variety of predefined specifications associated with an item 133 as constructed by a developer, such as, for example, images of the item 133, as well as the size, color, shape, a list of conditions associated with the item 133, or other information relevant to the item 133 as it relates to a corresponding application 160. For instance, if the item 133 is a pair of shoes that makes an avatar look more appealing, then the item descriptor 165 may comprise images of the shoes, a price to purchase the shoes, a text description of the shoes, and potentially other information. Alternatively, where the item 133 comprises an enhancement to a word processor, the item descriptor 165 may identify the functionality of the enhancement so that such functionality may be enabled with respect to the use of the application 160 by the user.

Upon obtaining the item descriptor 165 for an item 133, the application interface 118 may be configured to execute the item listing application 121. In one embodiment, the item listing application 121 may generate an item listing for each of the items 133 in the catalog 130 based upon the item descriptors 165 as described above. Specifically, the item descriptors 165 may be provided by a developer who navigates through multiple user interfaces 181 generated by data from the item listing application 121 to provide information comprising the item descriptors 165 to the electronic commerce system 115 so that the item 133 can be properly included in the catalog 130 and presented to customers who may wish to purchase the same.

For example, assume an item 133 is a weapon, such as a gun, which may be used during play with an application 160 that is a game application. Further assume that the item descriptor 165 comprises various specifications associated with the item 133, such as, for instance, a maximum number of bullets that may be loaded into the gun, a text description describing the functionality of the gun during play with the game application, and the like. In this case, the item listing application 121 may be configured to generate an item listing comprising unique images, colors, and sizes associated with the item 133 that corresponds to the parameters set forth in the item descriptors 165.

In yet another embodiment, the item listing application 121 may be configured to generate an item listing for an item 133 created by a user. For instance, in one embodiment, a user may be able to select a generic item descriptor 165 for the type of item 133 the user wishes to purchase. Thereafter, the item listing application 121 may be configured to generate an item listing based upon a user selection of colors, sizes, designs, associated with the item 133 that falls within the scope of the parameters defined in the generic item descriptor 165.

Upon generating item listings for various items 133, users of the electronic commerce system 115 may browse the items 133 they wish to purchase. To do so, in one embodiment, a user may navigate to an appropriate search field in a search network page to enter a search query directed to the items 133 the user would like to purchase. In addition, the search network page may further present a catalog taxonomy for the user to use to narrow down the items 133 subject to the search. Alternatively, the user may wish to search for items 133 specifying an application 160 for which items 133 are sought. To do so, the user may input one or more search terms describing the application 160 or the user may specify various taxonomy elements to identify the application 160.

According to one embodiment, a user purchases items 133 in association with their application account 162. Specifically, a user may create a user account 140 to facilitate the purchase of items 133 through the electronic commerce system 115. The same user may hold an application account 162 associated with an application 160 so that they may use the application 160. Such application account 162 may allow the operator of the application 160 to authenticate the user, charge for use of the application, and perform other tasks associated with the application 160. The user may provide one or more application accounts 162 to the electronic commerce system 115 in order to make purchases of items 133 to be used or that otherwise affect or bear on their use of the application 160. The application accounts 162 provided to the electronic commerce system 115 may be for the users themselves or for other individuals such as friends or relatives. The fact that application accounts 162 are provided to the electronic commerce system 115 for others allows respective users to purchase items 133 as gifts for others to be used by others when they engage in use of a given application 160 through their own application account 162. To facilitate providing the application accounts 163 to the electronic commerce system 115, various network content may be served up by the electronic commerce system 115 to facilitate the input of information identifying a particular application account 162 associated with the third party. Such information may include, for example, a username, an account number, and the like.

Before a user is allowed to make a purchase of a respective item 133, the electronic commerce system 115 is configured to verify that at least one application account 162 is associated with the respective user account 140 under which the user logged into the electronic commerce system 115. Specifically, a user may be prevented from purchasing an item 133 unless they can specify an application account 162 to which the purchased item 133 is to be applied. In one embodiment, if no application accounts 162 are associated with the respective user account 140, then appropriate network content may be served up to the respective client 106 that facilitates entry of one or more application accounts 162 by the user to be associated with the respective user account 140. At such point, the user may be allowed to purchase such items 133 for such application accounts 162.

In addition, assuming that one or more application accounts 162 are associated with the user account 140 of a purchasing user, then when generating network content that represents an item detail page to present an item 133 for purchase, the electronic commerce system 115 communicates with the respective application 160 to determine whether one or more application accounts 162 associated with the respective user account 140 in the electronic commerce system 115 are eligible to purchase the item 133. For example, it may be that a character in a game has not reached a required level necessary to allow the purchase of an item 133. Alternatively, a given user may not have purchased prerequisite features of a work productivity application 160 needed before the user can purchase a given item 133 for a respective application account 162.

Assuming that a user is eligible to purchase an item 133, they may proceed with the purchase in association with a respective application account 162. Once a user has purchased an item 133, the application interface 118 generates and sends a purchase notification 150 that notifies the respective application 160 executed on the application computing device 110 of the purchase of the respective item(s) 133. The purchase notification 150 includes all needed information so that the application 160 can incorporate the substance of the purchase into its operation. Alternatively, the application 160 may alter its operation in accordance with the purchase, or other appropriate action may be taken in view of the purchase. The information included in the purchase notification 150 comprises the application account 162 associated with the respective purchase so that the application 160 can identify which application user is to receive the benefit of the purchase.

The purchase notification 150 may also include any other information needed to implement the purchased item 133 with respect to the use of the application 160 by the respective user. Such information may include user application data 146 that relates to the use of the application by the user. Such information may include, for example, the identity of characters of a game for which an item 133 was purchased, the current features of a work productivity application with which additional functionality is to be associated, or other information.

Additionally, in some cases, a user may wish to link their user account 140 to their application account 162. To do so, a user may access and fill out forms presented in the form of user interfaces 179 generated based on network content served up by the electronic commerce system 115. In one embodiment, the user may provide security information in the request that may be used in order to access their application account 162, such as, for instance, a username, passwords, and so on. In another embodiment, such security information may have been previously provided and stored in association with the user account 140 of the user.

Upon receiving the request, the application interface 118 may be configured to request information about a respective application account 162 by sending a request to the application account 162 of the user along with security information associated with the respective application account 162. If the security information is proper, the application 160 may communicate information associated with the application account 162 to the application interface 118. Thereafter, the application interface 118 may record the same as user application data 146 in association with a respective user account 140.

As a non-limiting example, assume an application 160 is a game application that is configured to allow a user to create multiple avatars. Further assume that a listing of each avatar created by the user is stored in the user's application account 162. To this end, upon successfully accessing the user's application account 162, the game application may communicate the listing of each avatar to the application interface 118. The application interface 118 may then store such information as user application data 146 in data store 112 as described above.

A user associated with an application account 162 may then browse and select an item 133 for purchase as described above. In one embodiment, the electronic commerce system 115 may be configured to access the user application data 146 when the user is purchasing an item 133. For instance, assume the user application data 146 of a given user indicates that the user has created multiple avatars through interacting with an application 160. Further assume that an item 133 may be assigned to a particular avatar created by the user. In this example, the item detail page that presents the item 133 for purchase may also present a pick list of avatars so that the user can select the avatar for which the item 133 is to be purchased.

Thereafter, the electronic commerce system 115 may be configured to inform the application 160 of the purchase of the item 133 by the user. In one embodiment, the electronic commerce system 115 may execute the application interface 118 in order to generate the notification by specifying an application account 162 and the item 133 purchased for such application account 162. Additionally, in the example above, the notification may specify information from the user application data 146 that identifies pertinent information that may be needed by the application 160 in order to incorporate the item 133 purchased into the application experience of the user for which the item 133 was purchased. Taking the above example, the notification may inform the application 160 of the avatar for which a particular item 133 was purchased so that the application 160 can include the item 133 in the inventory associated with the particular avatar.

Additionally, once a user has purchased an item 133, the electronic commerce system 115 may be configured to generate one or more recommendations for other items 133 to present to the user from time to time when the user interacts with the electronic commerce system 115 in the future. In one embodiment, the application interface 118 may be configured to generate recommendations for other items 133 based upon the user's browse history, purchase history, user application data 146, and potentially other information.

For instance, assume that the user's browsing history indicates that the user has browsed various items 133 such as lasers the user may use while interacting with an application 160. In this example, the application interface 118 may be configured to search one or more application item descriptors 165 in order to identify other weapons associated with the application 160. Thereafter, the application interface 118 may be configured to generate and transmit network content comprising the recommended items 133 to the user. This brings other possible items 133 to the user's attention about which they may not have been aware.

Similarly, in another embodiment, the electronic commerce system 115 may be configured to generate recommendations for physical goods based upon the user's account data 143, user application data 146, and other information associated with the user. For instance, assume a user's browse history indicates the user has browsed various items 133 for an application 160 associated with the movie entitled "Harry Potter". In this example, the electronic commerce system 115 may be configured to identity other items 133 related to the Harry Potter movie, such as, for instance, Harry Potter books, t-shirts, and the like.

Figure 2A:
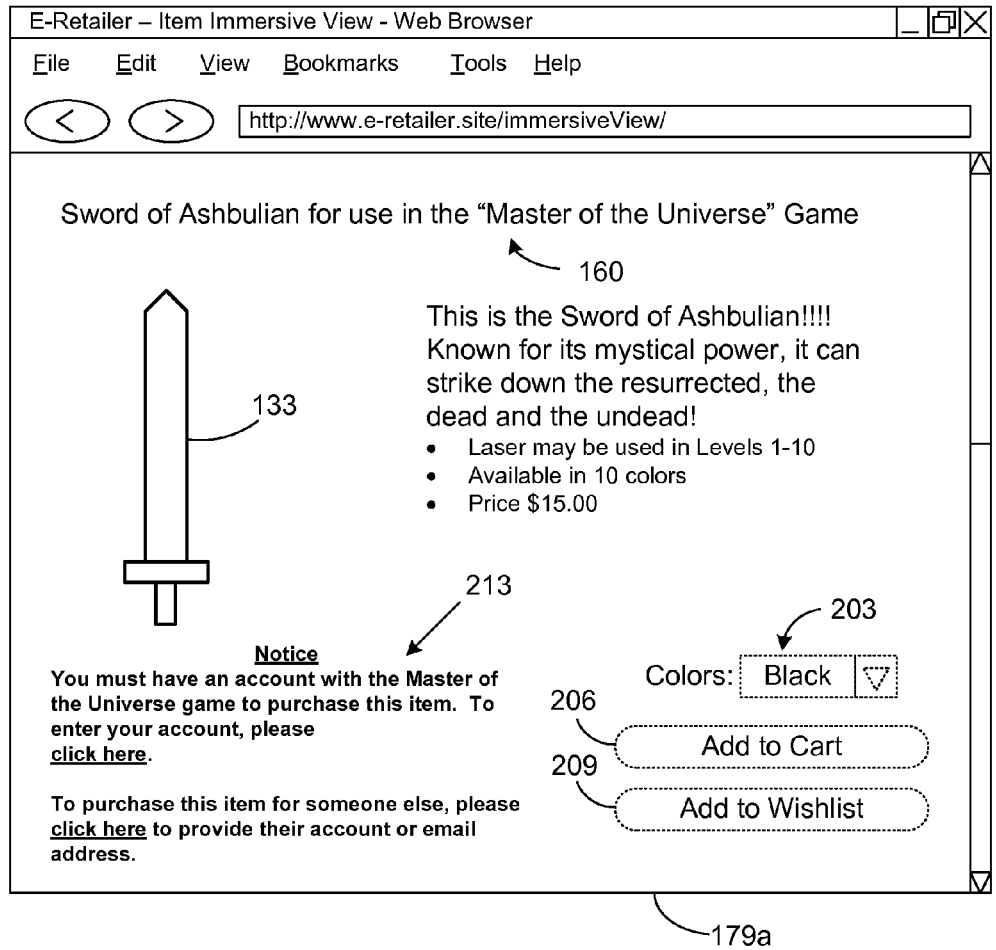
FIGS. 2A, 2B, and 2C are examples of user interfaces generated on the client of FIG. 1 according to various embodiments of the present disclosure.
Figure 2B:
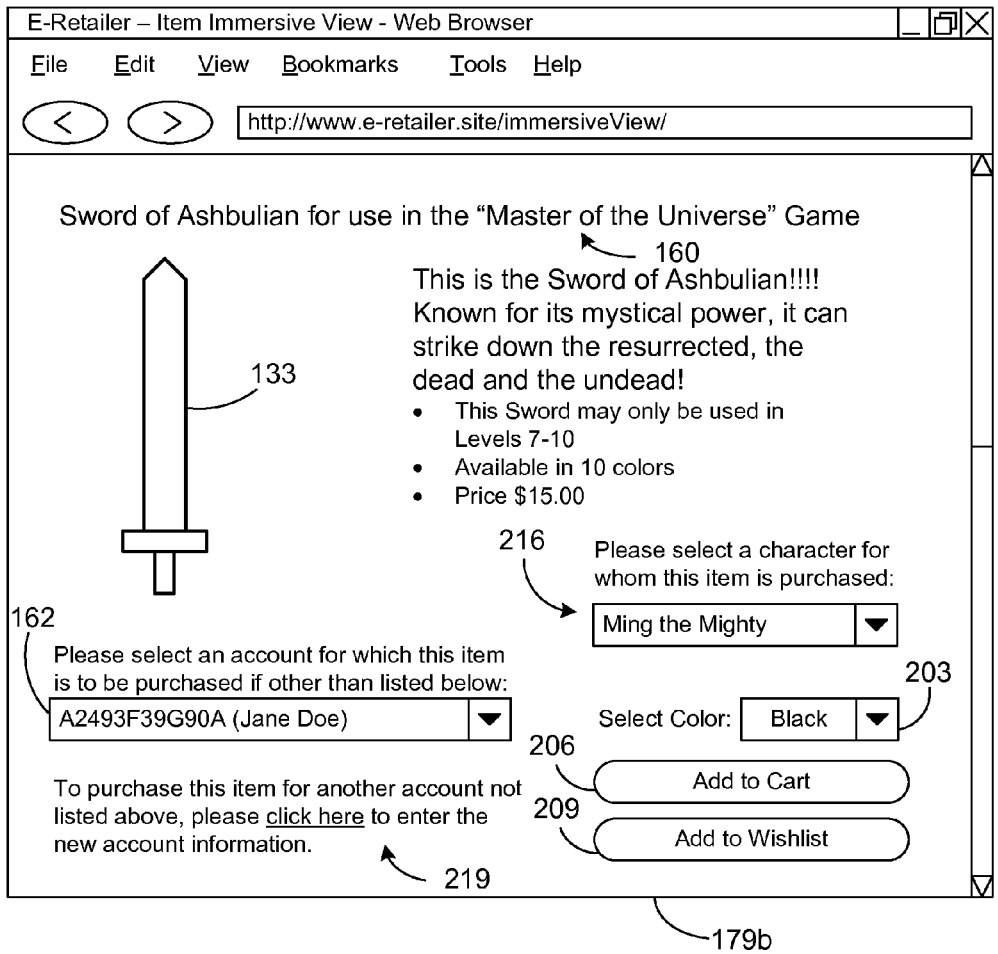
Figure 2C:
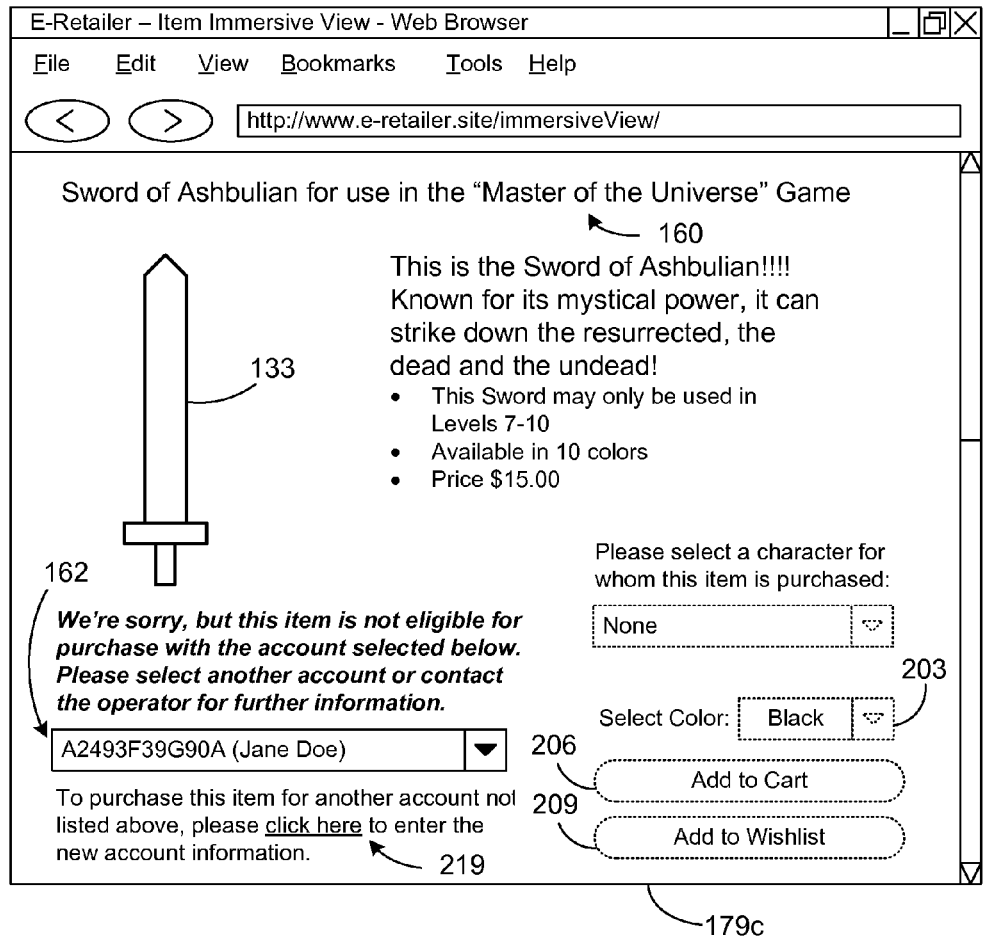

Referring next to FIGS. 2A, 2B, and 2C, shown are examples of user interfaces 179 that are rendered by the client side application 177 (FIG. 1) executed in a client 106 (FIG. 1) in the networked environment 100 (FIG. 1). With respect to FIG. 2A, shown is one example of a user interface 179, denoted herein as user interface 179a, that is generated when a user first browses a particular item 133 for an application 160, where there is no application account 162 (FIG. 1) associated with the respective user account 140 (FIG. 1) of the user. The user interface 179a may comprise a network page such as a web page or other type of network content served up to a client 106 by the electronic commerce system 115 (FIG. 1).

The user interface 179a shows an item 133 for purchase that is associated with a respective application 160. In one example, an image of the item 133 is shown along with a description and/or other information about the item 133. In addition, various selectors 203 are provided to facilitate a selection of one or more features associated with the item 133 such as color or other relevant features. The user interface 179a also includes an Add to Cart button 206 and an Add to Wishlist button 209. The Add to Cart button 206 and the Add to Wishlist button 209 are both obscured in the user interface 179a, thereby preventing a user from implementing these functions as will be described. In addition, the user interface 179a includes a notice 213 that includes one or more links to provide an application account 162 associated with the application 160.

The user interface 179a is presented to a user when the user is browsing an item 133 available for use with a given application 160, but there is no application account 162 for the respective application 160 associated with the user account 140 under which the user has logged into the electronic commerce system 115. According to one embodiment, the user is prevented from adding the item 133 to a shopping cart to implement a purchase, or from placing the item 133 in a wishlist, because such item 133 cannot be used by the user or by another user as a gift unless the application account 162 or at least an email address of the gift recipient is known. Specifically, without knowing the application account 162 for which a purchase of a given item 133 is to be made, the electronic commerce system 115 cannot inform the application 160 of the application account 162 to which the purchased item 133 is to be applied. If an email address of the recipient is known, then an email may be sent with a link to one or more network pages or other network content that facilitates the entry of an application account 162 for the recipient so that the purchase may be applied to their application account 162 as will be described.

In addition, if no application account 162 is identified in association with a respective purchase of an item 133, then the electronic commerce system 115 would not be able to send requests for user application data 146 (FIG. 1) associated with a respective application account 162 in order to present such information as needed in association with the purchase of an item 133. For example, if there are multiple characters associated with a given application account 162 for which an item 133 may be purchased, the electronic commerce system 115 would need to communicate with the application 160 given the respective application account 162 in order to obtain a list of all of the characters for which the item 133 may be purchased. Such listing may be included, for example, in the user interface 179a in the form of a pick list or other listing so that the user can select the character for whom the item 133 is to be purchased before placing the item 133 in a shopping cart or initiating a purchase in some other manner.

As per the user interface 179a, if a user wishes to enter an application account 162 or an email address of a gift recipient, the user may click the appropriate links set forth in the notice 213 in order to navigate through one or more further user interfaces 179 that present forms or other mechanisms to facilitate entry of one or more application accounts 162 for the application 160 identified in the user interface 179a. Alternatively, it is possible that a user may be able to place an item 133 in a shopping cart or wish list without providing an application account 162, where the electronic commerce system 115 may require such information to be entered at some other point in a checkout pipeline or during a navigation through various user interfaces 179 served up by the electronic commerce system 115. In addition, any selections that need to be made relative to a potential purchase of an item 133 based on user application data 146 may be made after such information is obtained after an appropriate application account 162 has been entered at some point by a user. Thus, the entry of an application account 162 and any selection to be made relative to user application data 146 may ultimately occur at any appropriate point in a purchase pipeline or at some other point during navigation through various user interfaces 179 presented by the electronic commerce system 115.

As an additional alternative, items 133 may be purchased without an associated application account 162, where the purchase notification 150 (FIG. 1) is sent to the user after an application account 162 is entered or otherwise provided to the electronic commerce system 115. In such a case, the fact of the purchase of an item 133 may be stored in association with the user account 140 along with an indication that an application account 162 needs to be entered before the appropriate application 160 may be informed of the purchase for the respective application account 162. In such case, the user may be reminded through messages in subsequent user interfaces 179 served up by the electronic commerce system 115 of the need to enter an application account in association with the previous purchase of the item 133. Also, emails, texts, and other messages may be sent to the user that have links back to user interfaces 179 that facilitate entry of an application account for the purchase.

As still another alternative, the user may purchase the item 133 even though no application account 162 is known. In such case, the email address of a gift recipient or other individual may be entered at some point in association with the purchase of the item 133. For example, an appropriate link is set forth in the user interface 179a as mentioned above, or an email address may be entered at some other point in the purchase process. The electronic commerce system 115 may then send an email to the email address of the gift recipient, where the email includes a link to a network page or other network content that facilitates entry of the application account 162 for the gift recipient. Once the application account 162 of the gift recipient has been entered, then the application interface 118 may inform the respective application 160 of the purchase of the item 133 as will be described. In situations where the application account 162 entered is not eligible to purchase the item 133, then store credit may be provided to allow the gift recipient to redirect the purchase to another item 133 for which the application account 162 is eligible as will be described.

As yet another alternative, a link may be provided in the notice 213 that facilitates creation of a new application account 162 that is then associated with the respective user account 140 under which the user has logged into the electronic commerce system 115. In such a case, the electronic commerce system 115 may be configured to interact with the application 160 to generate a new application account 162 for the user. To this end, the electronic commerce system 115 may act as an intermediate between the user and the application 160 to establish the new application account 162 by facilitating entry of any needed user information required by the application 160 to establish an application account 162.

FIG. 2B shows another example of a user interface 179, denoted herein as user interface 179b, in which one or more application accounts 162 are associated with the user account 140 (FIG. 1) under which the user is logged into the electronic commerce system 115 (FIG. 1). Specifically, the user interface 179b is similar to the user interface 179a described above with the exception that a pick list of application accounts 162 is included in the user interface 179b along with a selector 216 to facilitate a selection associated with user application data 146 (FIG. 1) if relevant to the item 133 (FIG. 1) viewed. Also, link 219 is provided that, when followed, facilitates the entry of an additional application account 162 to be added to the pick list.

When the user interface 179b is generated to present a detailed view of an item 133 for purchase, the electronic commerce system 115 requests any relevant user application data 146 and eligibility to purchase the item 133 for each of the application accounts 162 associated with the respective user account 140. If more than one application account 162 is associated with the user account 140, then a default one of the application accounts 162 is initially displayed in the pick list or other selection mechanism. According to the example user interface 179b, information associated with each application account 162 is included in the network content from which the user interface 179b is rendered. Such information includes, for example, whether each application account 162 is eligible to purchase the respective item 133 and any selections to be made with respect to the corresponding user application data 146.

As a user toggles from one application account 162 to another via the pick list or other mechanism, the Add to Cart button 206 and/or the Add to Wish List button 209 may or may not be obscured depending on whether the respective application account 162 is eligible to purchase the item 133. Also, a selector 216 may or may not appear depending upon whether there is a selection or other specification to be made relative to the relevant user application data 146.

Referring to FIG. 2C, shown is a further user interface 179 (FIG. 1), denoted herein as user interface 179c, according to an embodiment of the present disclosure. The user interface 179c depicts the Add to Cart button 206 and the Add to Wish List button 209 obscured due to the fact that the selected application account 162 is not eligible to purchase the item 133 depicted. In this respect, the user interfaces 179b and 179c are generated from network content that includes code that facilitates obscuring the buttons 206 and 209, and may show other changes based on the eligibility of the current selected application account 162. Alternatively, each user interface 179b, 179c may be generated in real time from network content received from the electronic commerce system 115 (FIG. 1) depending on the actions taken by the user. In addition, in another embodiment, if an email address associated with a designated recipient such as a gift recipient has been entered in association with the displayed item 133, the buttons 206/209 are not obscured as the email address or other network address can be used to ultimately procure an application account 162 as will be described. As such, the user may purchase the item 133 and the email address is used to obtain the application account 162 from the item recipient as will be described.

Figure 3:
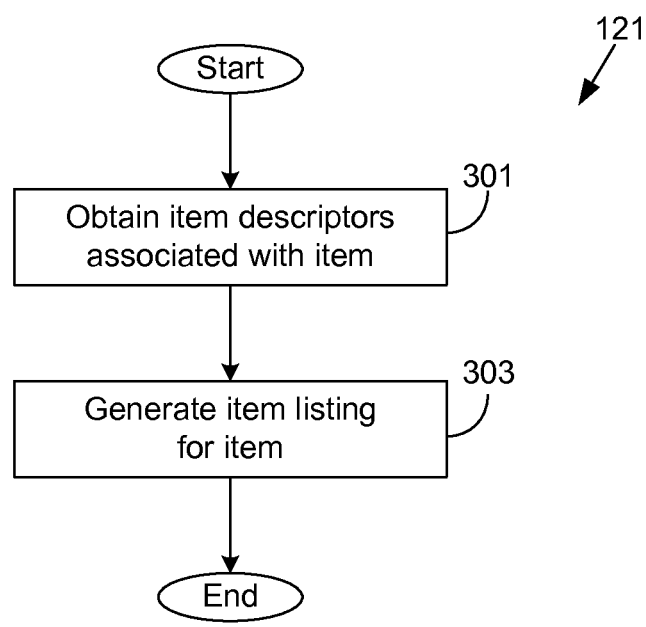
FIG. 3 is a flowchart illustrating one example of functionality implemented as portions of an item listing application executed in a computing device in the networked environment of FIG. 1 according to various embodiments of the present disclosure.

Referring next to FIG. 3, shown is a flowchart that provides one example of the operation of a portion of the item listing application 121 according to various embodiments. It is understood that the flowchart of FIG. 3 provides merely an example of the many different types of functional arrangements that may be employed to implement the operation of the portion of the item listing application 121 as described herein. As an alternative, the flowchart of FIG. 3 may be viewed as depicting an example of steps of a method implemented in the computing device 103 (FIG. 1) according to one or more embodiments.

Beginning with box 301, the item listing application 121 obtains one or more application item descriptors 165 (FIG. 1) from a developer client 108 (FIG. 1). As discussed above, the application item descriptors 165 include attributes which describe an item 133 (FIG. 1). In one embodiment, the item 133 may be a digital enhancement for an avatar such as a weapon, jewelry, and the like. To this end, the application item descriptors 165 may comprise images of the item 133, text descriptions of the item 133, specify a price or size of the item 133, and potentially other information.

Thereafter, in box 303, the item listing application 121 generates a listing for the item 133 based upon the item descriptors 165 received. Such listings are used to present the items 133 to users to facilitate a purchase of such items 133 as described above. Thereafter, this portion of the item listing application 121 ends as shown.

Figure 4:
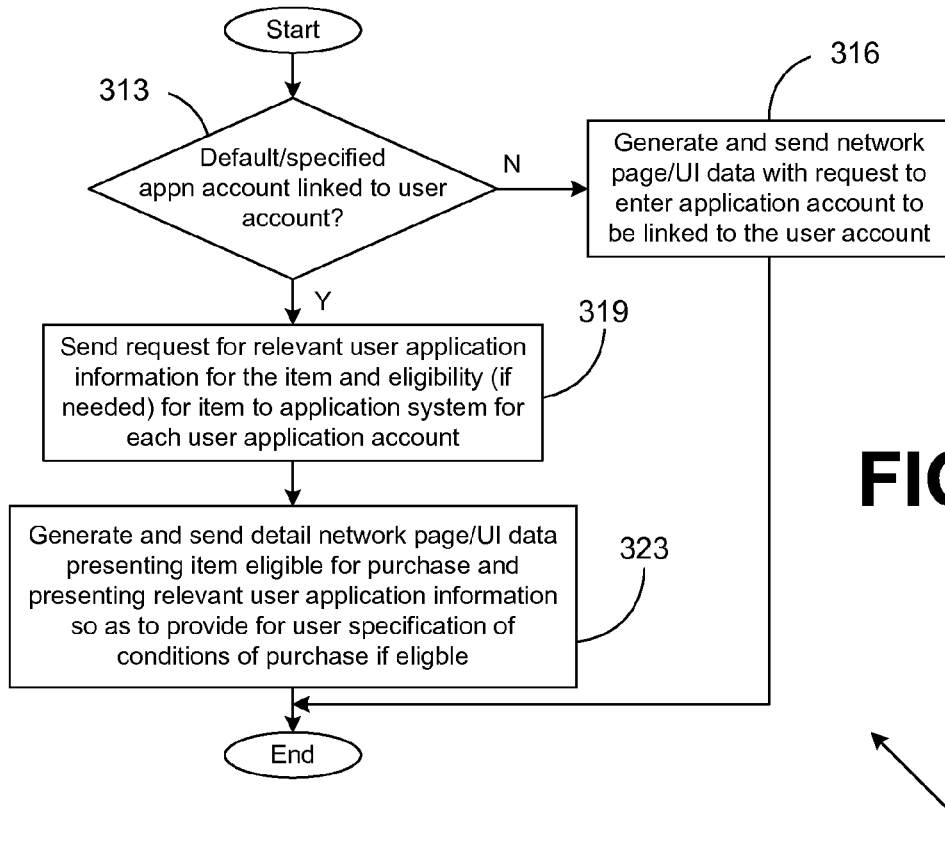
FIG. 4 is a flowchart illustrating one example of functionality implemented as portions of an electronic commerce system executed in a computing device in the networked environment of FIG. 1 according to various embodiments of the present disclosure.

With reference to FIG. 4, shown is a flowchart that provides one example of the operation of a portion of the electronic commerce system 115 that is implemented to serve up network content that is ultimately rendered on the client 106 (FIG. 1) as user interfaces 179 (FIG. 1) as described above according to various embodiments. It is understood that the flowchart of FIG. 4 provides merely an example of the many different types of functional arrangements that may be employed to implement the operation of the respective functions of the electronic commerce system 115 as described herein. As an alternative, the flowchart of FIG. 4 may be viewed as depicting an example of steps of a method implemented in the computing device 103 (FIG. 1) according to one or more embodiments.

Beginning with box 313, the electronic commerce system 115 determines whether there is at least one application account 162 (FIG. 1) associated with the respective user account 140 (FIG. 1) of a user who wishes to view a listed item 133 (FIG. 1). If not, then the electronic commerce system 115 moves to box 316. Otherwise, the electronic commerce system 115 progresses to box 319. In box 316, the electronic commerce system 115 generates and sends network content from which the user interface 179a (FIG. 2) can be rendered that includes a listing of the item 133 as well as the notice 213 (FIG. 2). The notice 213 includes the links that facilitate obtaining an application account 162 from the user given that no application account 162 is stored in association with the respective user account 140 in the electronic commerce system 115. In order to facilitate obtaining the application account 162 from the user, the electronic commerce system 115 is configured to facilitate obtaining one or more application accounts 160 (FIG. 1) by generating and serving up one or more user interfaces 179 that are navigated by a user in order to enter their respective application account 162 that is then associated with their user account 140 as can be appreciated. Thus application accounts 162 may be associated with the user or with third parties for whom the user might purchase the item 133. Once the network content that embodies the user interface 179a has been served up to the client 106 (FIG. 1) in box 316, then this portion of the functionality of the electronic commerce system 115 ends as shown.

Assuming that an application account 162 is associated with the respective user account 140 as determined in box 313 as described above, then the electronic commerce system 115 proceeds to box 319 in which a request is sent to the respective application 160 for any relevant user application data 146 for each application account 162 associated with the user account 140. Also, such request asks for the eligibility of each application account 162 associated with the respective user account 140 to purchase the item 133 depicted in the user interface 179. Note that the electronic commerce system 115 may first make a determination whether eligibility actually needs to be determined for the respective item 133 before sending the request for such information. Specifically, some items 133 may have no eligibility requirements. An attribute may be stored in the catalog 130 (FIG. 1) in the data store 112 (FIG. 1) as part of the descriptive information of the item 133 indicating whether eligibility needs to be determined. Such an attribute may be consulted by the electronic commerce system 115 to determine whether the eligibility of the respective application account to purchase an item 133 must be ascertained at all.

The electronic commerce system 115 then waits for a response from the respective application 160. Thereafter, in box 323, the electronic commerce system 115 generates and sends network content from which the user interfaces 179b/179c (FIG. 2B/2C) may be rendered that present the item 133 and indicates the eligibility for purchase by the user. Also, such user interfaces 179b/179c provide for user specification of the conditions of purchase such as any selections of relevant user application data 146 or other specifications. For example, the user may select a character for which an item 133 is to be purchased or other information as can be appreciated. After such network content is served up to the client 106 to present the respective user interfaces 179b/179c, this portion of the electronic commerce system 115 ends as shown. By generating the user interfaces 179b/179c and reacting accordingly to appropriate inputs using such user interfaces 179b/179c, the electronic commerce system 115 facilitates the selection of one of the application accounts 162 for which the item 133 is to be purchased.

Assuming that a user is eligible to purchase an item 133, for example, and adds the item 133 to a shopping cart by clicking on the Add to Cart button 206 (FIG. 2B), then the electronic commerce system 115 proceeds to facilitate the purchase of the item 133 over the network 109 (FIG. 1), where the item 133 is purchased in association with the specified application account 162 (FIG. 2B) that is, in turn, associated with the respective application 160 (FIG. 2B) identified in the user interface 179b. As was mentioned above, to facilitate the purchase of the item 133, the electronic commerce system 115 may present a progression of user interfaces 179 of a checkout pipeline to consummate the purchase as can be appreciated. Alternatively, the purchase of the item 133 may be consummated in some other manner such as by using a "one-click" approach or other approach.

Figure 5:
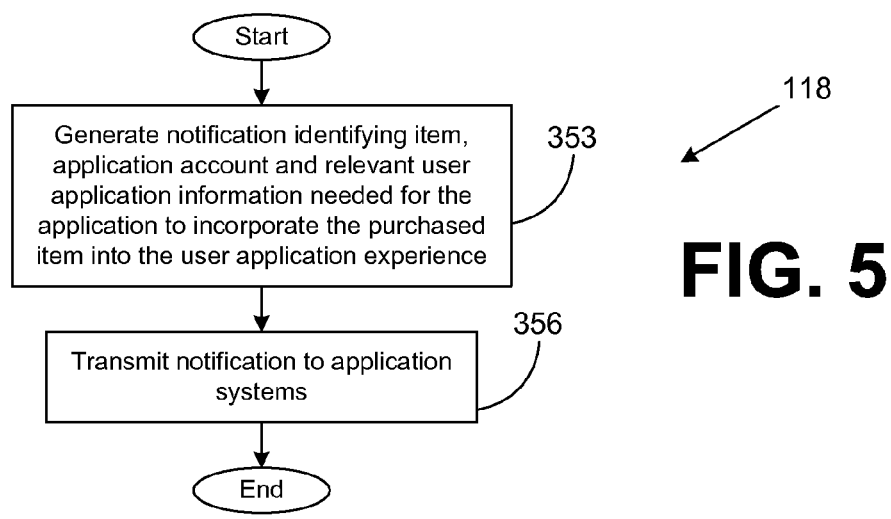
FIG. 5 is a flowchart illustrating one example of functionality implemented as portions of an application interface executed in a computing device in the networked environment of FIG. 1 according to various embodiments of the present disclosure.

With reference to FIG. 5, shown is a flowchart that provides one example of the operation of a portion of the application interface 118 according to various embodiments. It is understood that the flowchart of FIG. 5 provides merely an example of the many different types of functional arrangements that may be employed to implement the operation of the respective functions of the application interface 118 as described herein. As an alternative, the flowchart of FIG. 5 may be viewed as depicting an example of steps of a method implemented in the computing device 103 (FIG. 1) according to one or more embodiments.

The functionality described with reference to FIG. 5 comprises a portion of the application interface 118 that is implemented in order to notify an application 160 (FIG. 1) of the purchase of a given item 133 (FIG. 1) through the electronic commerce system 115 (FIG. 1). To this end, the purchase may be consummated via use of an appropriate checkout pipeline or other checkout system as can be appreciated. Once the item 133 has been purchased, then the application 160 needs to be notified of the purchase so that such item 133 purchased may be employed by a respective user when interacting with the application 160 as can be appreciated.

Beginning in box 353, the application interface 118 generates a notification that identifies the item 133 that was purchased. The notification also identifies the application account 162 (FIG. 1) for which such item 133 was purchased and any other relevant user application information needed for the application 160 incorporate the purchased item 133 into the user application experience. To this end, any specifications, information, or selections provided by the user with respect to the item 133 purchased may be included in the notification. Specifically, any relevant user application data 146 (FIG. 1) is included as specified by the user. Note that it may be possible that the item 133 was purchased for an application account 162 that is associated with a different user than the purchasing user. For example, such item 133 may have been purchased as a gift.

Thereafter, once the notification has been created in box 353, then in box 356, such notification is transmitted to the application 160. The application interface 118 may then wait to receive acknowledgement from the application 160 that the notification was received and properly incorporated into the application experience without error. The application interface 118 then ends as shown.

Figure 6:
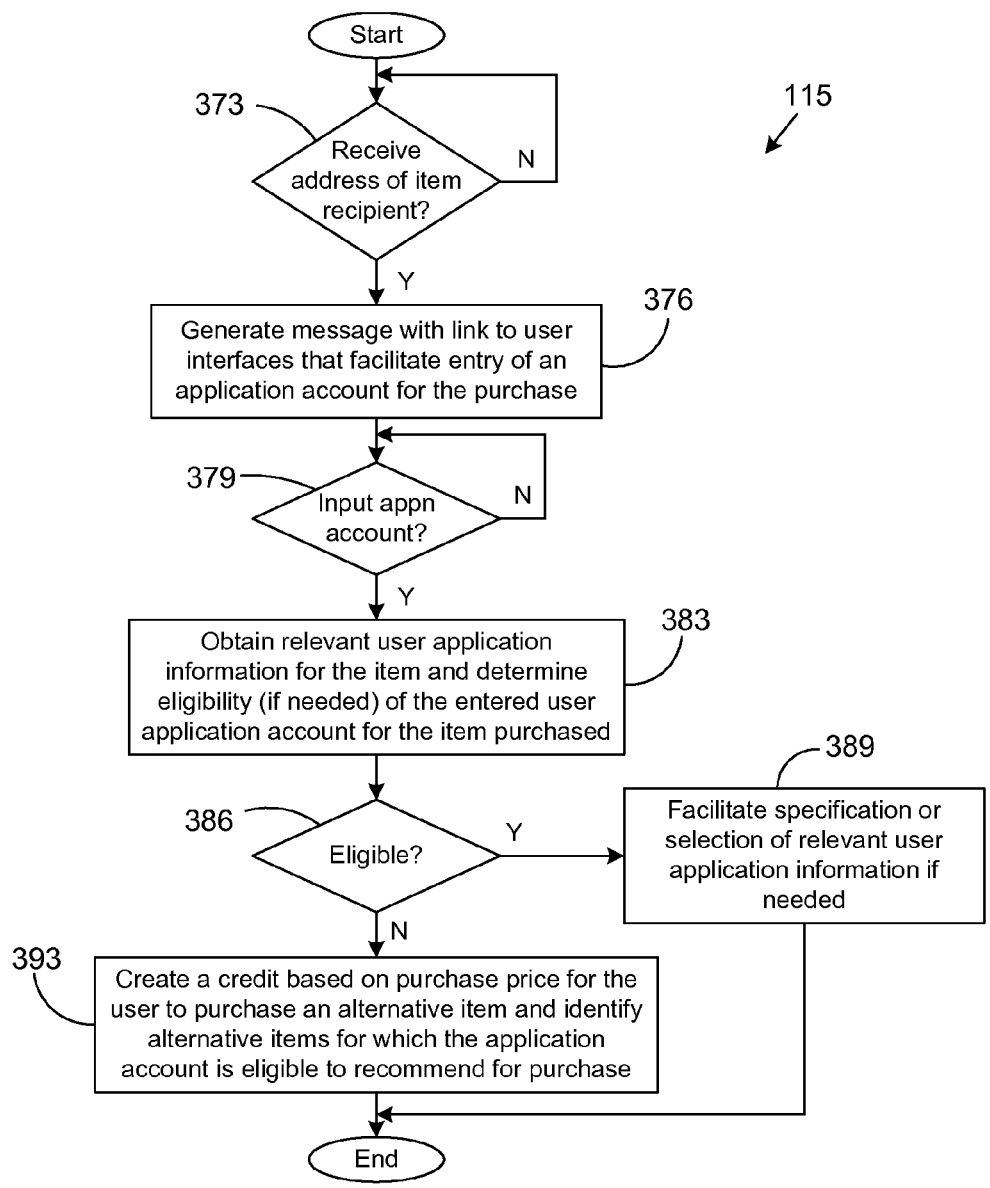
FIG. 6 is a flowchart illustrating one example of functionality implemented as portions of the electronic commerce system executed in a computing device in the networked environment of FIG. 1 according to various embodiments of the present disclosure.

With reference to FIG. 6, shown is a flowchart that provides one example of the operation of a portion of the electronic commerce system 115 according to various embodiments. It is understood that the flowchart of FIG. 6 provides merely an example of the many different types of functional arrangements that may be employed to implement the operation of the respective functions of the electronic commerce system 115 as described herein. As an alternative, the flowchart of FIG. 6 may be viewed as depicting an example of steps of a method implemented in the computing device 103 (FIG. 1) according to one or more embodiments.

The flowchart of FIG. 6 describes the functionality of the electronic commerce system 115 in facilitating the use of email or other messaging to obtain an application account 162 (FIG. 1) relative to a purchase of a given item 133 (FIG. 1), where the purchase is made without specifying an application account 162 for which the purchase is being made.

Beginning with box 373, the electronic commerce system 115 determines whether an email address or other network address has been input in association with a purchase of an item 133. An email address may have been entered before or after the purchase of the item 133 has been consummated. While the term "email address" is used herein with respect to the discussion of FIG. 6, it is understood that other types of addresses may be used such as Simple Message Service (SMS) messages or other types of messages.

Assuming that an email address is known, then the electronic commerce system 115 proceeds to box 376 in which an email message is generated that includes a link to one or more user interfaces 179 (FIG. 1) generated by the electronic commerce system 115 that facilitate(s) entry of an application account 162 to which the item 133 purchased is to be applied. The message is then sent to the email address. Thereafter, in box 379, the electronic commerce system 115 waits for the recipient of the email to enter or input their application account 162 by interacting with one or more user interfaces 179 from the electronic commerce system 115 responsive to the link. As an alternative, the user interfaces 179 may facilitate creation of a new application account 162 in situations where the recipient does not already possess an application account 162.

Assuming that an application account 162 has been entered or created as determined in box 379, then in box 383 the electronic commerce system 115 communicates with the respective application 160 to obtain relevant user application information and to determine whether the respective application account 115 is eligible for the purchase of the respective item 133 purchased. Note that in some cases, eligibility may not be relevant. In such case, the electronic commerce system 115 would not communicate with the application 160 about eligibility.

In box 386, the electronic commerce system 115 determines whether the respective application account 162 is eligible for the purchase. In some cases, the application account 162 may not be eligible for the item 133 such as might be the case if the respective user has not reached a specific level of operation associated with the application 160 or some other reason associated with the use of the application 160. In another example, a user may not be eligible for the purchase of the item 133 due to the fact that they already possess the item 133 and duplicates cannot be held by the same application account 162 as per application requirements. In addition, there may be other reasons why a given application account 162 is not eligible to purchase a given item 133.

Assuming that the respective application account 162 is eligible to receive the item 133 purchased, then the electronic commerce system 115 proceeds to box 389 to facilitate a specification or selection relating to the relevant user application information as mentioned above. In some cases, such a specification or selection is necessary in order to make use of the item 133 purchased. For example, in the context of a game, it may be necessary to select a character to which the purchased item 133 is assigned. Thereafter, this portion of the electronic commerce system 115 ends, and the application interface 118 is then invoked as described with reference to FIG. 5 to notify the application 160 of the item 133 purchased.

Assuming that the user is not eligible to purchase the respective item 133 in box 386, then the electronic commerce system 115 proceeds to box 393 in which a credit is created for the purchase price of the item 133 purchased by the giftor. Such credit may be saved in the form of a digital gift card or other credit instrument. In addition, the electronic commerce system 115 may determine items 133 that the application account 162 is eligible to purchase to present to the user in one or more user interfaces 179 as recommendations for purchase in place of the item 133 initially purchased but determined ineligible. To this end, the electronic commerce system 115 may facilitate browsing through various items 133 for a given application as potential replacements for the item 133 that could not be purchased for the respective application account 162. Thereafter, the electronic commerce system 115 ends as shown.

Figure 7:
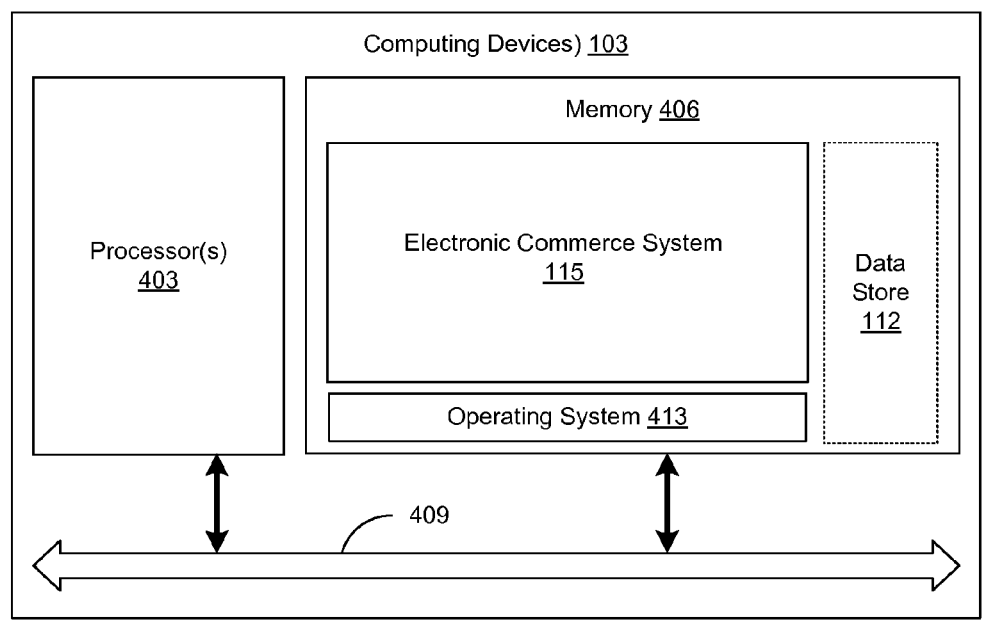
FIG. 7 is a schematic block diagram that provides one example illustration of a computing device employed in the networked environment of FIG. 1 according to various embodiments of the present disclosure.

With reference to FIG. 7, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several other components that are executable by the processor 403. In particular, stored in the memory 406 and executed by the processor 403 are the electronic commerce system 115 that includes the application interface 118 (FIG. 1), item listing application 121 (FIG. 1), network page encoder 124 (FIG. 1), and potentially other components. Also, stored in the memory 406 and executed by the processor 403 is an operating system 413, and potentially other applications. Also stored in the memory 406 may be a data store 112 and other data.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the electronic commerce system 115, including the application interface 118, the item listing application 121, and the network page encoder 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates or other components, etc. Such technologies are generally well known by those skilled in the art and, consequently, are not described in detail herein.

The flowchart of FIGS. 3, 4, 5, and 6 show the functionality and operation of an implementation of portions of the application interface 118, the item listing application 121, the electronic commerce system 115, and potentially other components. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 3, 4, 5, and 6 show a specific order of execution, it is understood that the order of execution may differ from that which is depicted. For example, the order of execution of two or more blocks may be scrambled relative to the order shown. Also, two or more blocks shown in succession in FIG. 3, 4, 5, or 6 may be executed concurrently or with partial concurrence. Further, in some embodiments, one or more of the blocks shown in FIG. 3, 4, 5, or 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, such as the electronic commerce system 115, or the application interface 118, the item listing application 121 or the network page encoder 124 as a portion of the electronic commerce system 115, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method comprising:
    associating an application account obtained from a user with a respective one of a plurality of user accounts to an electronic commerce system, wherein the application account is associated with a game application and facilitates at least authentication of the user by the game application, wherein the plurality of user accounts are maintained in association with the electronic commerce system and facilitate purchase of a virtual item by the user via the electronic commerce system, wherein the virtual item is for use in association with the game application;
    encoding, by a computing device associated with the electronic commerce system, for rendering on a client device, a user interface of the electronic commerce system that presents the virtual item for sale by the electronic commerce system, the virtual item comprising a virtual good used during an interaction with the game application, wherein the user interface further includes a selection mechanism to specify relevant user application data from the application account of the game application in association with a purchase of the virtual item, wherein the relevant user application data comprises an operational feature of the game application to which the virtual item is to be applied, wherein the user interface of the electronic commerce system operates independently of the game application;
    determining, by the computing device associated with the electronic commerce system, the purchase of the virtual item is subject to at least one eligibility requirement in response to communicating with the game application, wherein the user interface prevents the purchase of the virtual item in association with the application account when the user application data associated with the application account does not satisfy the at least one eligibility requirement; and
    responsive to the purchase of the virtual item by the user, automatically sending, by the computing device associated with the electronic commerce system, a notification to an application computing device hosting the game application of the purchase of the virtual item for the application account, the notification facilitating incorporation of the purchased virtual item within the operation of the game application by the user.

2. The method of claim 1, further comprising encoding for rendering on the client device at least one input mechanism to facilitate an input of the application account to be associated with the respective one of the plurality of user accounts.

3. A method, comprising:
    offering a virtual item for sale via an electronic commerce system implemented in at least one of one or more computing devices, the virtual item relating to an interaction with a game application;
    maintaining, in at least one of the one or more computing devices, a plurality of user accounts in association with the electronic commerce system to facilitate a purchase of the virtual item by a user via the electronic commerce system;
    associating, in at least one of the one or more computing devices, an application account with a respective one of the plurality of user accounts, the application account being associated with the game application and facilitating at least authentication of the user by the game application;
    determining, in at least one of the one or more computing devices, that the purchase of the virtual item is subject to at least one eligibility requirement in response to communicating with the game application to which the purchase of the virtual item is to be applied;
    determining, in the at least one of the one or more computing devices, that user application data associated with the application account satisfies the at least one eligibility requirement;
    facilitating, in at least one of the one or more computing devices, the purchase of the virtual item through a user interface of the electronic commerce system, wherein the user interface further includes a selection mechanism to specify relevant user application data from the application account of the game application in association with the purchase of the virtual item, wherein the user interface of the electronic commerce system operates independently of the game application; and
    responsive to the purchase of the virtual item, automatically sending, in at least one of the one or more computing devices, a message from the electronic commerce system to an application computing device executing the game application, the message indicating the virtual item purchased and the application account to facilitate use of the virtual item during the interaction by the user with the game application.

4. The method of claim 3, wherein associating, in at least one of the one or more computing devices, the application account with the respective one of the plurality of user accounts, further comprises associating a plurality of possible application accounts with the respective one of the plurality of user accounts, wherein each of the plurality of possible application accounts is associated with the game application.

5. The method of claim 4, further comprising:
    presenting, in at least one of the one or more computing devices, a list of the plurality of possible application accounts; and
    obtaining, in at least one of the one or more computing devices, a selection of one of the plurality of possible application accounts to be designated as the application account with which the purchase of the virtual item through the electronic commerce system is associated.

6. The method of claim 3, wherein the virtual item further comprises a subscription to use at least a portion of the game application.

7. The method of claim 3, wherein the game application further comprises a service.

8. A system, comprising:
    at least one computing device; and
    an electronic commerce system accessible to the at least one computing device, the electronic commerce system being configured to sell a virtual item by at least:

associating a user account of the electronic commerce system with an application account associated with a game application and used to facilitate at least authentication of a user by the game application;

encoding for display a user interface of the electronic commerce system that presents the virtual item for sale, the virtual item being configured to be used during an interaction with the game application, wherein the user interface further includes a selection mechanism to specify user application data from the application account of the game application in association with a purchase of the virtual item, wherein the user application data comprises an operational feature of the game application to which the virtual item is to be applied, wherein the user interface of the electronic commerce system operates independently of the game application;

determining the purchase of the virtual item is subject to at least one eligibility requirement in response to communicating with the game application, wherein the user interface prevents the purchase of the virtual item in association with the application account when the user application data associated with the application account does not satisfy the at least one eligibility requirement; and responsive to the purchase of the virtual item, automatically sending a notification to an application computing device executing the game application, the notification indicating the virtual item purchased and the application account to facilitate use of the virtual item during the interaction by the user with the game application.

9. The system of claim 8, wherein the user application data identifies a functionality of the game application that is to be enhanced by application of the virtual item.

10. The system of claim 8, wherein the user application data specifies an association between the virtual item and an avatar used by the game application.

11. The system of claim 8, wherein the electronic commerce system is further configured to encode for display an input mechanism to facilitate an input of the application account to be associated with the user account.

12. The system of claim 8, wherein the electronic commerce system is further configured to associate the user account with a plurality of application accounts.

13. The method of claim 1, wherein the relevant user application data identifies an avatar in the game application to which the virtual item is to be applied.

14. The method of claim 13, wherein the relevant user application data further specifies an association between the virtual item and the avatar used by the game application.

15. The method of claim 1, wherein the user interface further includes another selection mechanism to specify an item descriptor associated with a parameter of the virtual item.

* * * * *